United States Patent
Song

(10) Patent No.: US 11,697,924 B2
(45) Date of Patent: Jul. 11, 2023

(54) DAMPER STRUCTURE

(71) Applicant: SUNGBO INDUSTRIAL CO., LTD., Incheon (KR)

(72) Inventor: Keun Chul Song, Seoul (KR)

(73) Assignee: SUNGBO INDUSTRIAL CO., LTD., Incheon (KR)

( * ) Notice: Subject to any disclaimer, the term of this patent is extended or adjusted under 35 U.S.C. 154(b) by 697 days.

(21) Appl. No.: 16/687,933

(22) Filed: Nov. 19, 2019

(65) Prior Publication Data

US 2021/0017740 A1    Jan. 21, 2021

(30) Foreign Application Priority Data

Jul. 17, 2019  (KR) .................. 10-2019-0086672

(51) Int. Cl.
*E02F 9/28* (2006.01)
*F16F 1/373* (2006.01)

(52) U.S. Cl.
CPC ............ *E02F 9/2841* (2013.01); *F16F 1/373* (2013.01); *F16F 2224/025* (2013.01); *F16F 2224/0208* (2013.01); *F16F 2234/00* (2013.01)

(58) Field of Classification Search
CPC . E02F 9/2841; F16F 1/373; F16F 2224/0208; F16F 2224/025; F16F 2234/00
See application file for complete search history.

(56) References Cited

U.S. PATENT DOCUMENTS

| | | | |
|---|---|---|---|
| 2,987,332 A * | 6/1961 | Bonmartini | ............ B62D 55/12 29/451 |
| 3,685,178 A * | 8/1972 | Ratkowski | ............ E02F 9/2841 37/457 |
| 3,894,349 A | 7/1975 | Moreau | |
| 4,192,089 A * | 3/1980 | Schwappach | ......... E02F 9/2841 37/457 |
| 5,152,088 A * | 10/1992 | Hahn | .................... E02F 9/2825 37/458 |
| 5,852,888 A | 12/1998 | Cornelius | |
| 10,329,742 B2 | 6/2019 | Ryu et al. | |
| 2019/0203445 A1* | 7/2019 | Song | ..................... E02F 9/2841 |
| 2022/0074172 A1* | 3/2022 | Song | ..................... F16F 15/124 |

FOREIGN PATENT DOCUMENTS

| | | |
|---|---|---|
| JP | H11-107329 A | 4/1999 |
| JP | 2016-089412 A | 5/2016 |
| KR | 10-2006-0011366 A | 2/2006 |
| KR | 10-1817064 B1 | 1/2018 |

OTHER PUBLICATIONS

An Office Action mailed by the Korean Patent Office dated Sep. 1, 2020, which corresponds to Korean Patent Application No. 10-2019-0086672 and is related to U.S. Appl. No. 16/687,933.
International Search Report issued in PCT/KR2020/008991; dated Oct. 6, 2020.

* cited by examiner

*Primary Examiner* — Xuan Lan Nguyen
(74) *Attorney, Agent, or Firm* — Studebaker & Brackett PC

(57) ABSTRACT

Disclosed is a damper structure in contact with a connection unit for coupling a first coupling structure part and a second coupling structure part, including a damper part formed of an elastic material and at least one fixing part coupled to at least one surface of the damper part and protruding outward, and coming into contact with the connection unit and moving toward the damper part by pressure applied by the connection unit when the connection unit is separated or fastened.

5 Claims, 20 Drawing Sheets

DAMPER STRUCTURE

CROSS-REFERENCE TO RELATED APPLICATIONS

This present application claims the benefit of Korean Patent Application No. 10-2019-0086672, filed on Jul. 17, 2019, in the Korean Intellectual Property Office. The disclosures of which is herein incorporated by reference in their entirety.

BACKGROUND

1. Field

The present disclosure relates to a damper structure, and more particularly, to a damper structure of a coupling structure for controlling an operation of a connection unit connecting a first coupling structure and a second coupling structure.

2. Description of Related Art

A digging apparatus (or an excavation apparatus) such as an excavator used in public works or mines is used to dig earth and stone and pile up the dug earth or stone to other locations or a cargo box of a vehicle.

Such a digging apparatus generally has a bucket coupled to a mechanical arm and used to dig and carry earth or stone.

The end of the bucket is equipped with a plurality of tooth points which are used to dig and crush earth or stone.

Here, the tooth points are connected to the bucket via a tooth adapter connected to the bucket, and thus, the plurality of tooth points are substantially connected to the tooth adapter.

When a digging operation is performed through such a digging apparatus, a direct digging operation such as digging an excavation spot, moving soil and gravel, and the like, is performed by the tooth points, and thus, the tooth points wear with the lapse of time.

Therefore, wear of the tooth points exceeds a set value (or a set state), it is necessary to replace the tooth points to ensure a smooth digging operation and protect the excavator.

RELATED ART DOCUMENT

Patent Document

Korean Patent Laid-Open Publication No. 10-2006-0011366

SUMMARY

An aspect of the present disclosure is to enhance a life of a damper structure which controls a coupling state of a first coupling structure part and a second coupling structure part.

Another aspect of the present disclosure is to increase combining power of first coupling structure part and a second coupling structure part by enhancing a binding force of a connection unit coupling the first coupling structure part and the second coupling structure part.

Another aspect of the present disclosure is to reduce manufacturing cost of a damper structure for controlling a coupling state of a first coupling structure part and a second coupling structure part.

According to an aspect of the present disclosure, a damper structure in contact with a connection unit for coupling a first coupling structure part and a second coupling structure part, including: a damper part formed of an elastic material; and at least one fixing part coupled to at least one surface of the damper part and protruding outward, and coming into contact with the connection unit and moving toward the damper part by pressure applied by the connection unit when the connection unit is separated or fastened.

The damper part may have a hexahedral shape, and the at least one fixing part may include a first fixing part having a first quadrangular insertion recess provided at a middle portion thereof and allowing one side surface portion of the damper part to be inserted and coupled to the first insertion recess; and a second fixing part having a second quadrangular insertion recess provided at a middle portion thereof and allowing the other side surface portion of the damper part opposing the one side surface portion to be inserted and coupled to the second insertion recess.

The damper part may include protrusions respectively located on upper and lower surface portions opposing each other.

The first fixing part may further include a close contact protrusion protruding from an outer surface thereof.

An outer surface of the second fixing part may be formed of a plane surface.

An outer surface of the second fixing part may be formed of a curved surface.

The first fixing part and the second fixing part may each have a quadrangular planar shape.

The damper part may have a quadrangular recess at a middle portion of the one surface, and the at least one fixing part may include one fixing part inserted into the recess and coupled thereto such that an inner surface thereof is in contact with an inner surface of the damper part in contact with a longer axis of the recess.

A depth of the recess may be smaller than a shorter axis width of the one fixing part.

The fixing part may compress the surface of the damper part in contact with the inner surface thereof when pressure is applied from the outside due to contact with the connection unit.

The fixing part may be compressed until the outer surface thereof protrudes outward with respect to an adjacent outer surface of the damper part.

The damper part may have a hexahedral shape, and the at least one fixing part may include first and second fixing parts respectively covering opposing surfaces of the damper part and a third fixing part located between the first and second fixing parts and covering another surface of the damper part.

The third fixing part may protrude outward with respect to the first and second fixing parts.

The third fixing part may be movable separately from the first and second fixing parts.

The third fixing part may compress an inner surface of the damper part in contact with an inner surface thereof when pressure is applied from the outside due to contact with the connection unit.

The third fixing part may be compressed until the adjacent outer surfaces of the first and second fixing parts protrude outward with respect to the outer surface thereof.

The damper part may be formed of an elastomer.

The at least one fixing part may be formed of a metal.

The first coupling structure may be a tooth adapter and the second coupling structure may be a tooth point.

BRIEF DESCRIPTION OF DRAWINGS

The above and other aspects, features and other advantages of the present disclosure will be more clearly understood from the following detailed description taken in conjunction with the accompanying drawings, in which:

FIGS. 8A, 8B, 8C are a cross-sectional view of a coupling hole when a connection unit is inserted into the coupling hole in which a damper structure of a tooth for a bucket of an excavator according to the embodiment of the present disclosure is inserted, wherein FIG. 8A is a view immediately after the coupling unit is inserted, FIG. 8B is a view showing a process in which the connection unit is rotated in a corresponding direction for fastening of the connection unit, and FIG. 8C is a view after the connection unit is rotated in the corresponding direction for fastening of the connection unit.

DETAILED DESCRIPTION

Hereinafter, embodiments of the present invention will be described in detail with reference to the accompanying drawings. In describing the present invention, if it is determined that a detailed description of known functions and components associated with the present invention unnecessarily obscure the gist of the present invention, the detailed description thereof will be omitted. The terms used henceforth are used to appropriately express the embodiments of the present invention and may be altered according to a person of a related field or conventional practice. Therefore, the terms should be defined on the basis of the entire content of this specification.

Technical terms used in the present specification are used only in order to describe specific exemplary embodiments rather than limiting the present invention. The terms of a singular form may include plural forms unless referred to the contrary. It will be further understood that the terms "comprise" and/or "comprising," when used herein, specify the presence of stated features, integers, steps, operations, elements, and/or components, but do not preclude the presence or addition of one or more other features, regions, integers, steps, operations, elements, components, and/or groups thereof.

Hereinafter, a damper structure of a tooth for a bucket of an excavator according to an embodiment of the present disclosure will be described with reference to the accompanying drawings.

First, a damper structure of a tooth for a bucket of an excavator (hereinafter, referred to as a "damper structure") according to an embodiment of the present disclosure will be described with reference to FIGS. 1 to 3.

Figure 1:
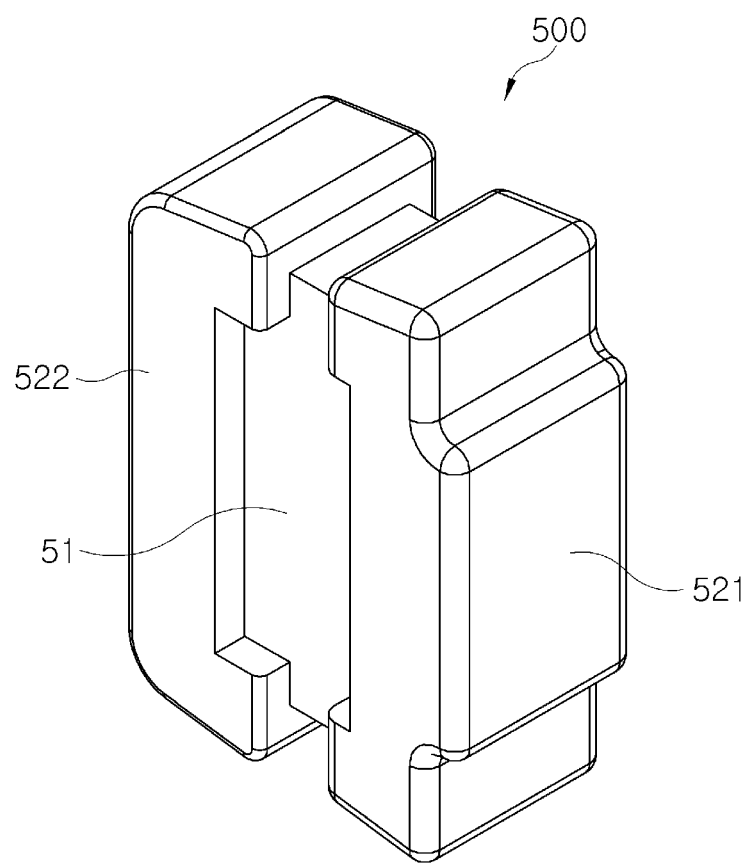
FIG. 1 is a perspective view of a damper structure of a tooth for a bucket of an excavator according to an embodiment of the present disclosure.
Figure 2:
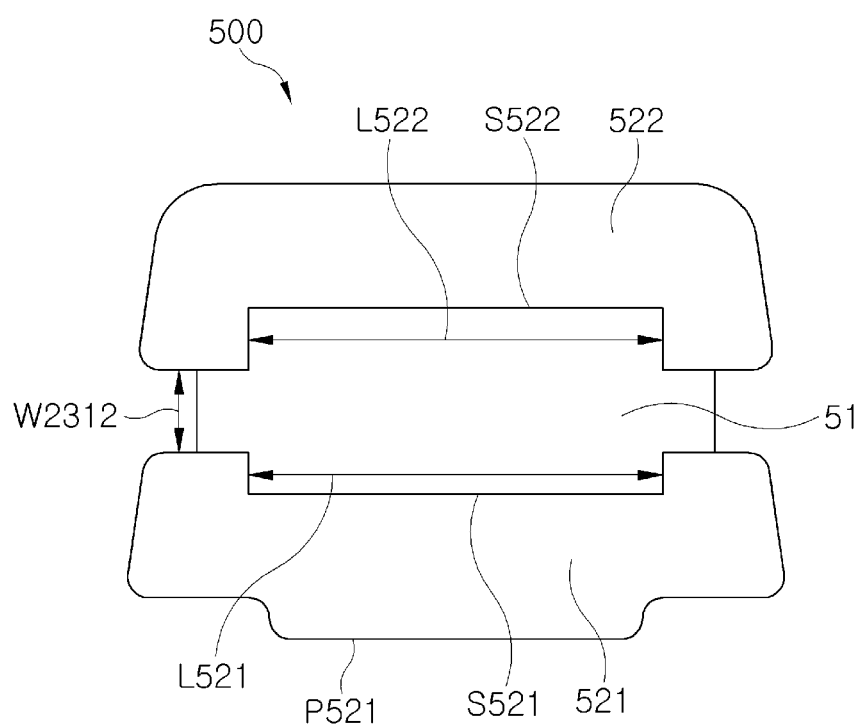
FIG. 2 is a front view of the damper structure of a tooth for a bucket of an excavator shown in FIG. 1.
Figure 3:
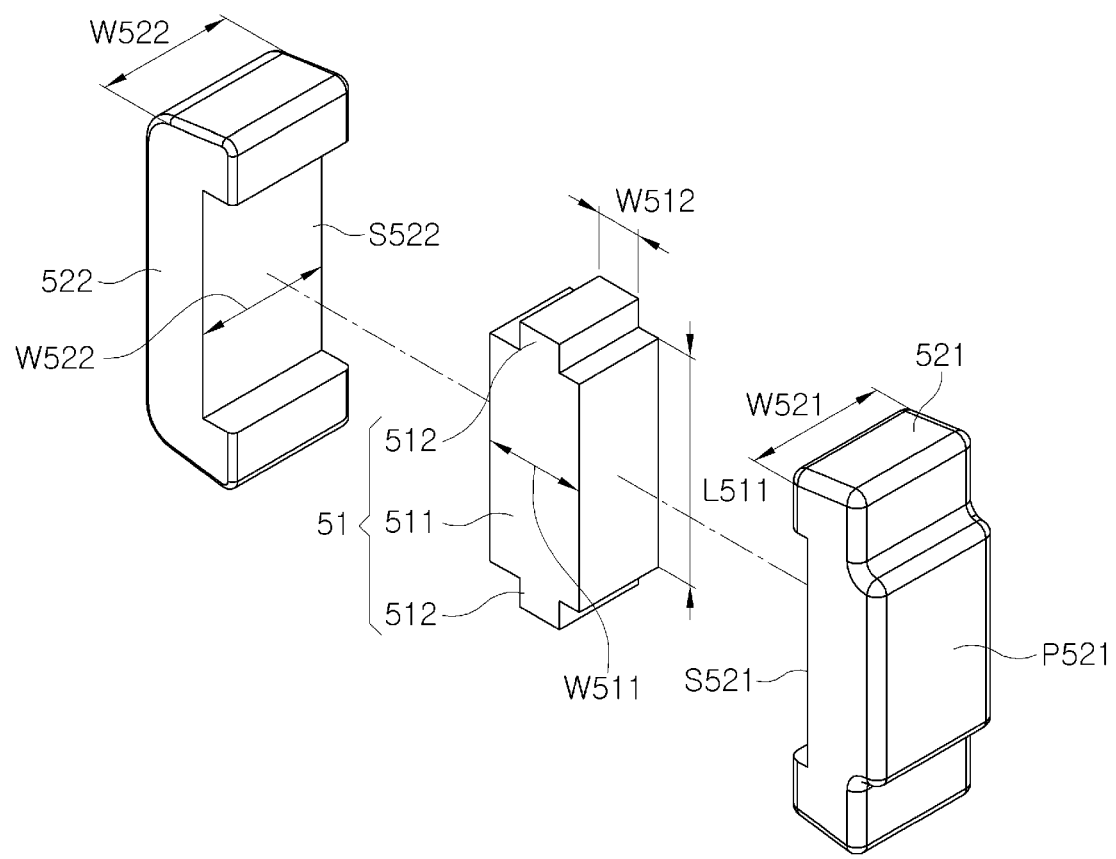
FIG. 3 is an exploded perspective view of the damper structure of a tooth for a bucket of an excavator shown in FIG. 1.

As illustrated in FIGS. 1 to 3, the damper structure 500 of the present embodiment includes a damper part 51 and first and second fixing parts 521 and 522 located on side surface portions facing each other on the mutually opposite sides of the damper part 51 and covering the side surface portions, respectively.

The damper part 51 is formed of an elastic material such as an elastomer having an elasticity, such as rubber or silicon.

Therefore, when pressure is applied toward the first fixing part 521, the damper part 51 is compressed to move a position of the first fixing part 521 toward the second fixing part 522, and when the pressure applied to the damper part 51 is released, the damper part 51, which has been compressed, is restored by a restoring force to return the position of the first fixing part 521 to an initial state.

As illustrated in FIGS. 2 and 3, the damper part 51 has a hexahedral shape and includes, for example, a damper body 511 having a cube shape and protrusions 512 respectively located on both end portions, i.e., a top portion and a bottom portion, of the damper body 511.

The first fixing part 521 and the second fixing part 522 have a substantially cube shape and have a substantially 'C' shape having insertion recesses S521 and S522 provided at substantially middle portions and allowing one side surface portions of the damper body 511 of the damper part 51 to be inserted thereto as illustrated in FIGS. 2 and 3.

These insertion recesses S521 and S522 have the same shape, for example, a rectangular planar shape, and longer axis lengths L521 and L522 and shorter axis lengths W521 and W522 of the insertion recesses S521 and S522 are determined depending on longer axis lengths and shorter axis lengths of the corresponding side surface portions of the damper body 511 inserted thereto, respectively.

Sizes of the longer axis lengths L521 and L522 and shorter axis lengths W521 and W522 of the insertion recesses S521 and S522 are determined depending on the longer axis lengths and shorter axis lengths of the corresponding side surface portions of the damper body 511 inserted thereto, respectively.

In this example, the first fixing part 521 further includes a close contact protrusion P521 protruding outward from an outer surface opposite to an inner surface which is a portion where the insertion recess S521 is located.

Accordingly, one side surface portion of the damper body 511 of the damper part 51 is inserted into the insertion recess S521 of the first fixing part 521 and the other side surface portion of the damper body 511 opposing the one side surface portion is inserted into the insertion recess S522 of the second fixing part 522, whereby the damper part 51 is inserted into and installed in the first and second fixing parts 521 and 522.

Here, since the inserting operation of the damper part 51 with respect to the first and second fixing parts 521 and 522 is made up to formation positions of the protrusions 512, an insertion degree of the damper part 51 with respect to the first and second fixing parts 512 and 522 is determined by the formation positions of the protrusions 512, that is, the width W512. The insertion degree of the damper part 51 with respect to the 1st and 2nd fixing parts 521 and 522 is determined by W512. Accordingly, the protrusions 512 located at both ends of the damper part 51 are located outside the insertion recesses S521 and S522 and are located in a space formed by the first and second fixing parts 521 and 522 facing each other, without protruding outward, as shown in FIG. 2.

In order to increase a mounting force of the damper part 51, the longer axis length L511 of the damper body 511 of the damper part 51 may be smaller than the longer axis lengths L521 and L522 of the insertion recesses S521 and S522 of the first and second fixing parts 521 and 522, and a shorter axis length W511 of the damper body 511 may be smaller than shorter axis lengths W521 and W522 of the insertion recess S521 and S522.

Therefore, an operator compresses the damper part 51 and insert the corresponding side surface portions of the damper part 51 into the insertion recesses S521 and S522. After the insertion operation, the damper part 231 is stably located in the insertion recesses S521 and S522 of the first and second fixing parts 521 and 522 by the restoring force of the damper part 51.

As such, since both side surface portions of the damper part 51, which are worn or deformed by adhesion such as rubber, are respectively covered by the first and second fixing parts 521 and 522 formed of a material having good durability such as metal, a possibility of damage or breakage of the damper part 51 is significantly reduced and a wear phenomenon is also significantly reduced.

Thus, durability of the damper structure 500 of the present example is improved and life of the damper structure 500 is increased.

Further, the close contact protrusion P521 protruding from the outer surface of the first fixing part 521 increases adhesion with a connection unit of a tooth for a bucket adhered to the damper structure 500, that is, a connection unit coupling a tooth adapter and a tooth point, thus enhancing a binding force of the damper structure 500. As a result, a position variation of the damper structure 500 due to an external impact or the like is significantly reduced, thereby increasing life of the damper structure 500.

Next, an example of a tooth 100 for a bucket to which the damper structure 500 of the present example is mounted will be described with reference to FIGS. 4 to 7B.

Figure 4:
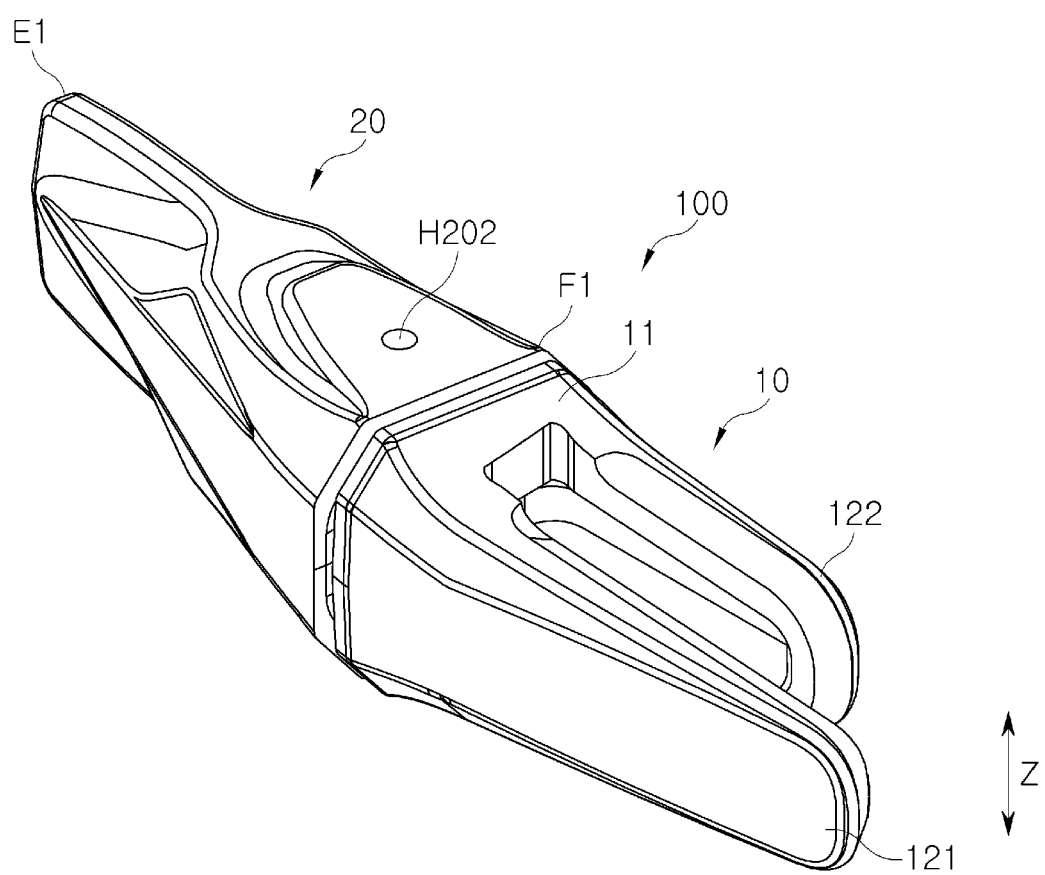
FIG. 4 is a perspective view of an example of a tooth for a bucket to which a damper structure of a tooth for a bucket of an excavator according to an embodiment of the present disclosure is applied.
Figure 5:
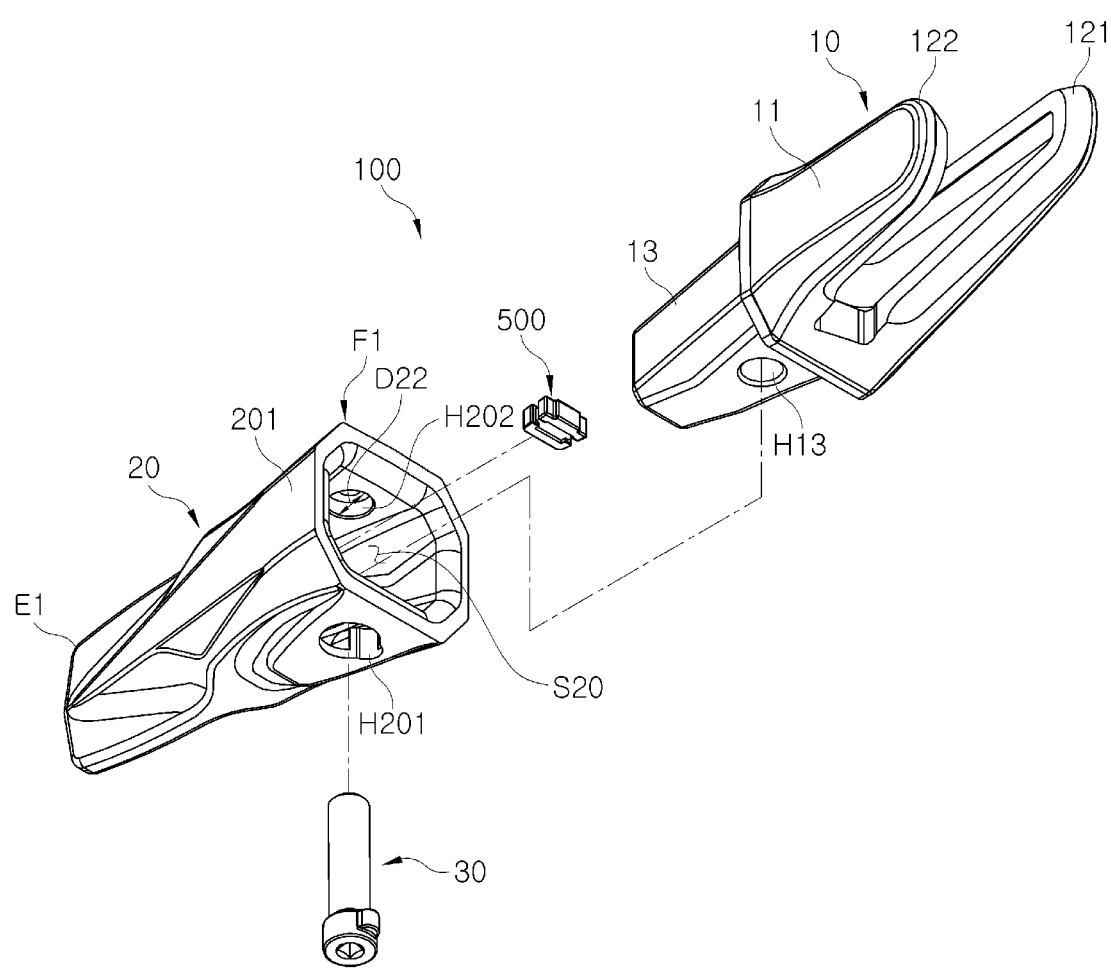
FIG. 5 is an exploded perspective view of the tooth for a bucket shown in FIG. 4.

Referring to FIGS. 4 and 5, the tooth for a bucket (i.e., a coupling structure) 100 of an excavator of the present example includes a tooth adapter (e.g., a first coupling structure part) coupled to a bucket (not shown) of an excavator, a tooth point (e.g., a second coupling structure part) 20 connected to the tooth adapter 10, and a connection unit 30.

The tooth adapter 10 includes an adapter body 11, first and second mounting portions 121 and 122 extending backward from the adapter body 11, and an insertion portion 13 extending forward from the adapter body 11.

In the present disclosure, the tooth adapter 10 side in FIG. 4 is referred to as the rear and the tooth point 20 side is referred to as the front.

The adapter body 11 has a substantially quadrangular planar shape.

The first and second mounting portions 121 and 122 are fixedly coupled to a bucket of the excavator, are located at corresponding portions on the mutually opposite sides of a rear surface as a corresponding surface of the adapter body 11, e.g., left and right portions of the adapter body 11, and are spaced apart from each other.

Referring to FIGS. 4 and 5, the first mounting portion 121 protrudes from the left portion of the rear surface of the adapter body 11 and extends backwards, and the second mounting portion 122 protrudes from the right portion of the rear surface of the adapter body 11 and extends backwards.

The first and second mounting portions 121 and 122 are configured to have a shape of a protrusion reduced in size in a cross-section thereof toward the rear side.

The insertion portion 13, which is coupled to the tooth point 20, has a shape of a protrusion protruding forwards from a front surface of the adapter body 11 and has a cross-section reduced in the extending direction.

Here, the cross-section of the insertion portion 13 has a polygonal shape, and an upper surface and a lower surface thereof are flat.

The insertion portion 13 has a first coupling hole H13 penetrating through the insertion portion 13 in a thickness direction Z of the insertion portion 13. Here, the first coupling hole H13 is located adjacent to the adapter body 11 and completely penetrates through the insertion portion 13 from the upper surface to the lower surface of the insertion portion 13, or vice versa.

Accordingly, the first and second mounting portions 121 and 122 and the insertion portion 13 extend by corresponding lengths, respectively, in the opposite directions based on the adapter body 11.

The tooth point 20, which is coupled with the tooth adapter 10 to dig an excavation spot, includes a point body 201 having second and third coupling holes H201 and H202 located to correspond to each other on two surfaces (e.g., the upper and lower surfaces) opposing each other, a guide portion 21 located in the second coupling hole H201 of the point body 201 and controlling a rotational operation of the connection unit 30, and a support 24 where the damper structure 500 is located.

Figure 7A:
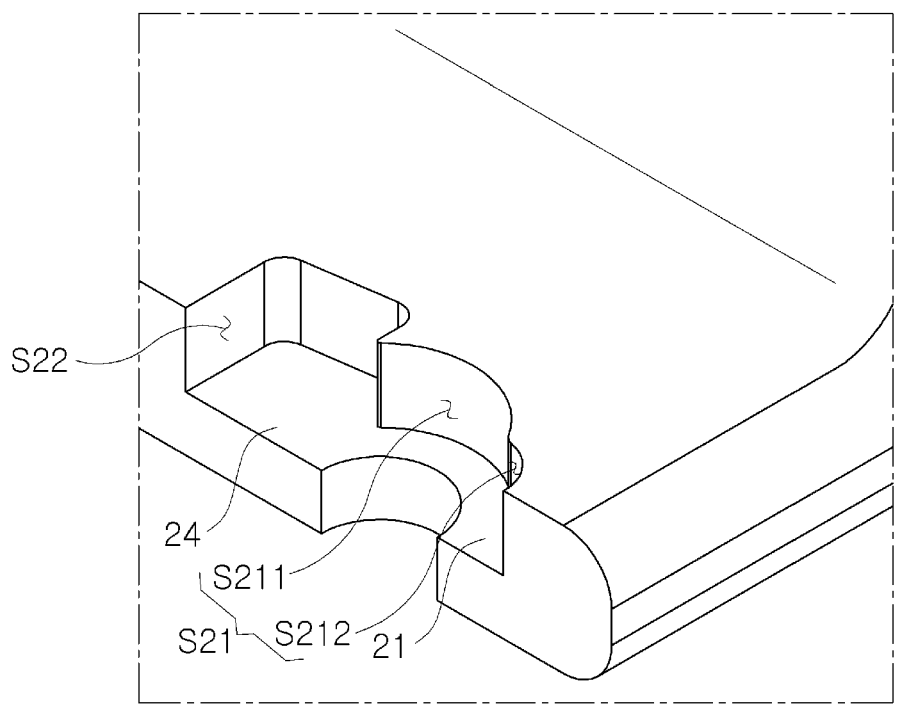
FIG. 7A is an enlarged partial view of a first coupling hole shown in FIG. 5.

As shown in FIG. 7A, the support 24 is located on an inner surface of the point body 201 in the second coupling hole H201 (that is, the surface contiguous with the second coupling hole H201).

Referring back to FIG. 5, the point body 201 of the tooth point 20 further includes an insertion recess S20 as an empty space, into which the insertion portion 13 of the tooth adapter 10 is inserted, at a middle portion thereof in addition to the second and third coupling holes H201 and H202. The second and third coupling holes H201 and H202 communicate with the insertion recess S20.

Since the insertion recess S20 is a space into which the insertion portion 13 of the tooth adapter 10 is inserted as described above, a shape and a length of the insertion recess S20 are determined depending on an appearance of the insertion portion 13 and a protruding length of the insertion portion 13. Thus, in the insertion recess S20, a diameter of the space thereof is reduced from a front end F1 toward a rear end E1 of the tooth point 20, like the shape of the insertion portion 13.

When the insertion portion 13 of the tooth adapter 10 is inserted into the insertion hole S20 of the tooth point 20, a rear surface of the front end of the tooth point 20 adjacent to the tooth adapter 10 comes into contact with a front surface as a corresponding surface of the adapter body 11 of the tooth adapter 10. Thus, a cross-sectional shape and a size of the rear surface of the front end adjacent to the tooth adapter 10 are determined on the basis of a shape and a size of the front surface of the adapter body 110.

The second and third coupling holes H201 and H202 located on the opposite sides are holes into which the connection unit 30 is inserted.

The damper structure 500 of the present example is mounted on the support 24 located in the second coupling hole H201 to control insertion and removal of the connection unit 30.

Here, the damper structure 500 is located on the support 24 such that the first fixing part 521 is adjacent to the connection unit 30 and the second fixing part 522 is adjacent to the point body 201.

The connection unit 30 is a pin which is inserted into the second and third coupling holes H201 and H202 and the first coupling hole H13 when the insertion portion 13 is inserted into the insertion recess S20, to couple the tooth point 20 to the tooth adapter 10.

Thus, the second and third coupling holes H201 and H202 are located at corresponding positions of the upper surface and the lower surface of the tooth point 20 overlapping the first coupling hole H13 when the insertion portion 13 is inserted into the insertion recess S20.

The connection unit 30 may be formed of a metal, such as stainless steel, having good durability such as water resistance and wear resistance.

Figure 6A:
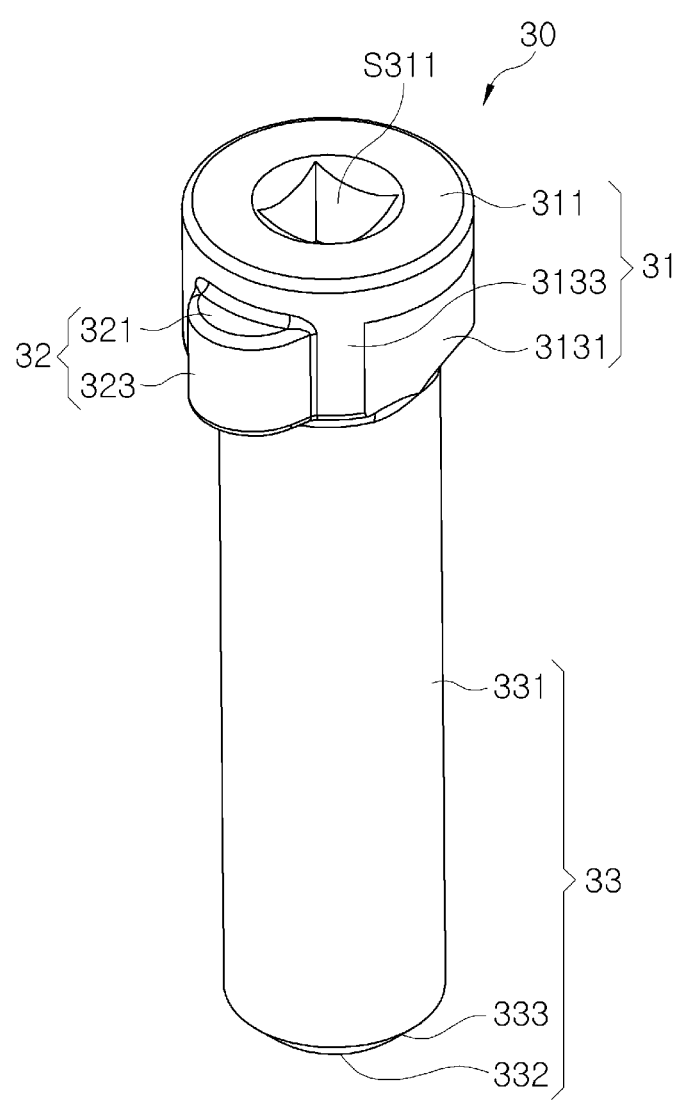
FIGS. 6A through 6C are perspective views of a connection unit shown in FIG. 4, viewed in different directions, respectively.
Figure 6B:
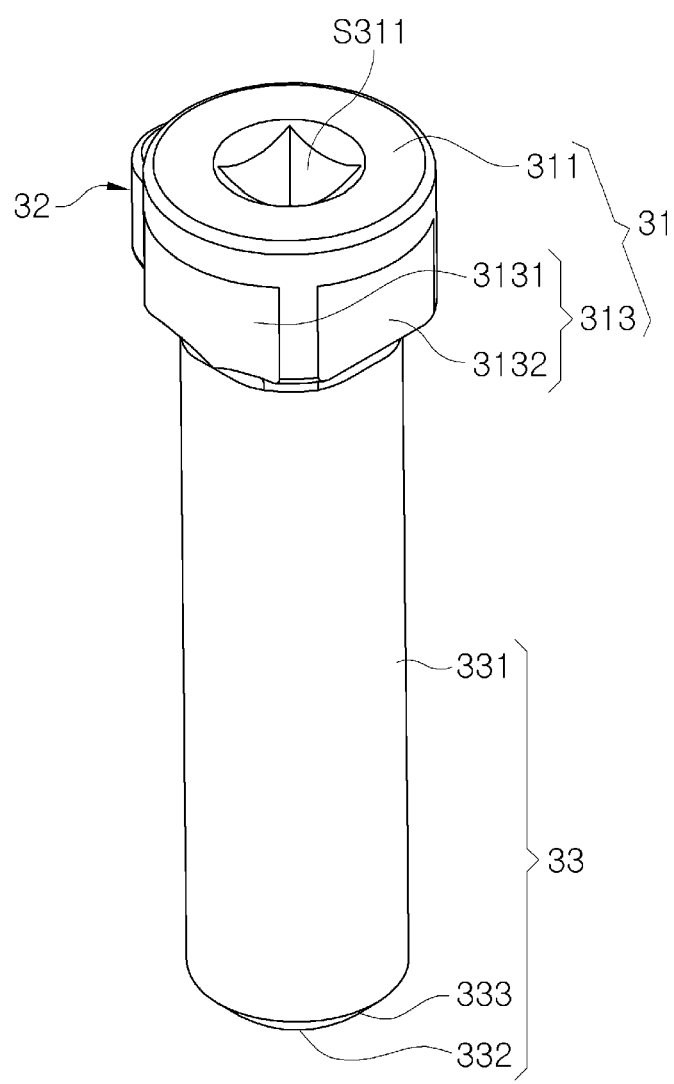
Figure 6C:
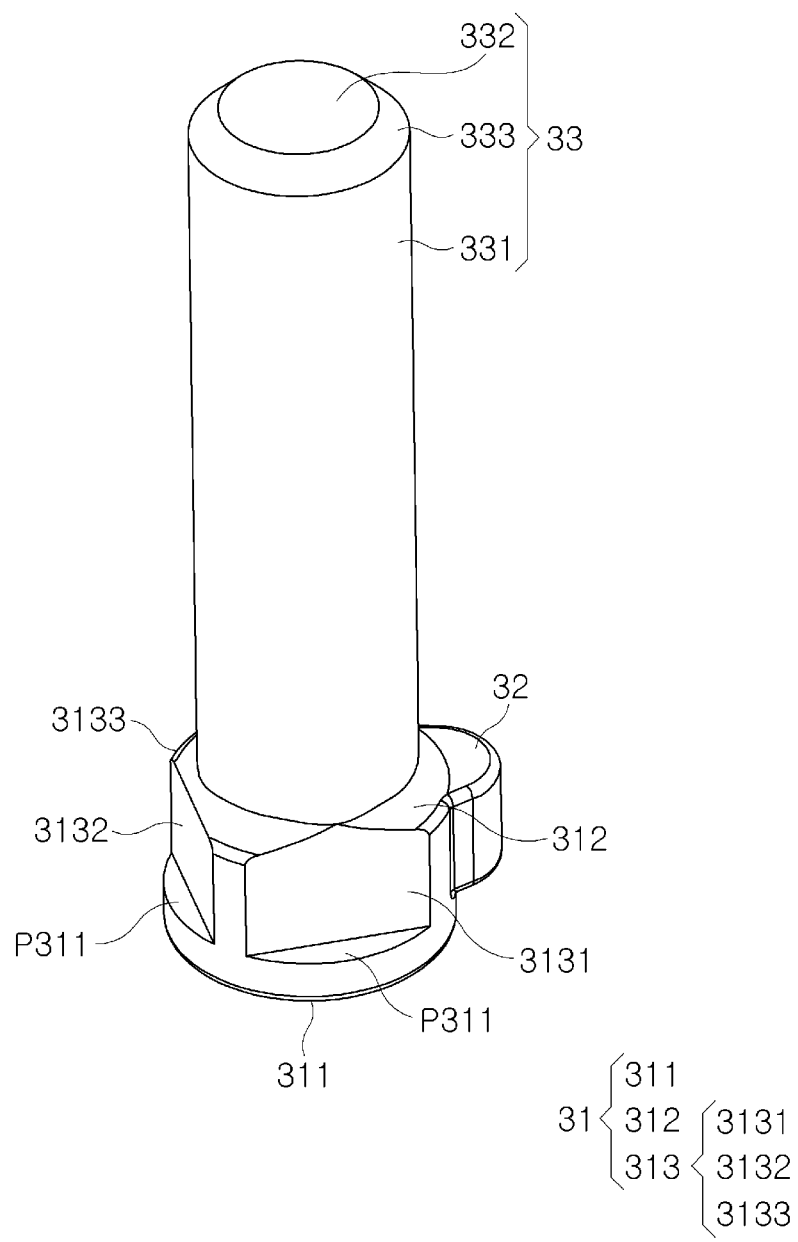

The connection unit 30 inserted into the second and third coupling holes H201 and H202 has a column shape inserted into the second and third coupling holes H201 and H202 as shown in FIGS. 6A to 6C.

More specifically, the connection unit 30 includes a coupling portion 31, a protrusion 32 protruding outward from the coupling portion 31, and an insertion portion 33 extending from the coupling portion 31 in one direction which is a thickness direction Z of the insertion portion 13.

In the present example, the coupling portion 31 is inserted into the second coupling hole H201 and coupled with the second coupling hole H201. However, the present disclosure is not limited thereto and the coupling portion 31 may be inserted into only the first coupling hole H13 or both the first and second coupling holes H31 and H201 and coupled with only the first coupling hole H13 or coupled with both the first and second coupling holes H31 and H201.

This coupling portion 31 includes an upper surface 311 having a circular planar shape, a lower surface 312 located opposite the upper surface 311, and a side surface 313 which connects the upper surface 311 and the lower surface 312 and is parallel to one direction Z.

The upper surface 311 has a square recess S311, as an empty space, located at a middle portion and having a square planar shape. Here, the square recess S311 has a predetermined depth.

The square recess S311 is a portion into which a device such as a square wrench is inserted when the connection unit 30 is inserted into the second and third coupling holes H201 and H202. Here, the operator may insert the corresponding device into the square recess S311, strike a head portion of the corresponding device with a hammer or the like to insert the connection unit 30 into the second and third coupling holes H201 and H202, and subsequently rotate the connection unit 30 in a predetermined direction, thus performing the operation of inserting and coupling to the second and third coupling holes H201 and H202.

Thus, since a cross-sectional shape of the recess S311 has an angulated shape, such as a square shape, or the like, a rotational operation in the corresponding direction may be easily performed.

However, the cross-sectional shape of the recess S311 is not limited to the square shape but may be a polygon such as a hexagon, or the like, depending on the type of equipment in use, and at least one surface thereof may be a curved surface.

The side surface 313 of the coupling portion 31 includes first and second flat surface portions 3131 and 3132 cut from the upper surface 311 to the lower surface 312 in one direction Z so as to be flat and a curved portion 3133 located between the first and second flat surface portions 3131 and 3132.

Here, the first and second flat surface portions 3131 and 3132 are located adjacent to each other and located only up to a predetermined distance from the lower surface 312.

In this example, an angle formed by the two adjacent flat surface portions 3131 and 3132 may be approximately 90 degrees.

Further, a curved surface may be formed between the two adjacent flat surface portions.

Accordingly, the side surface 313 of the coupling portion 31 includes the first portion (i.e., the circular portion) located at an upper portion adjacent to the upper surface 311 and curved in every portion and a second portion including the first and second flat surface portions 3131 and 3132 and the curved portion 3133.

As described above, the planar shape of the first portion is circular shape, and the planar shape of the second portion has two rectilinear portions connected to each other and one curved portion. Here, a portion between two rectilinear portions adjacent to each other in the second portion may also be configured as a curved portion.

Accordingly, an engagement protrusion P311, which is a lower surface of the exposed first portion, is located between the second portion where the first and second flat surface portions 3131 and 3132 are located and the first portion.

The insertion portion 33 has a cylindrical shape having a circular planar shape.

Thus, the insertion portion 33 includes a side surface 331 connected to the lower surface of the coupling portion 31 and extending in the form of a cylinder.

Here, a diameter of the side surface 331 is smaller than a diameter of the upper surface 311 of the coupling portion 31 but larger than a diameter of the lower surface 332. Thus, an inclined surface 333 is provided between the side surface 331 and the lower surface 332.

The protrusion 32 protrudes outward from the curved portion 3133 of the side surface 313 of the coupling portion 31.

As shown in FIGS. 6A to 6C, the protrusion 32 of the present example includes an upper surface 321, a lower surface 322 located opposite to the upper surface 321, and a side surface 323 located between the upper surface 321 and the lower surface 322.

Here, the upper surface 321 may be flat or have a recess at a central portion.

A height of the lower surface 322 of the protrusion 32 may be equal to a height of the lower surface of the first portion, that is, a position of the engagement protrusion P311 but an edge portion where the lower surface 322 and the side surface 323 meet may be chamfered.

The side surface 323 may be formed of one curved surface. As such, a curvature of the side surface 323 formed of the curved surface is smaller than a curvature of the upper surface of the coupling portion 31.

Accordingly, as shown in FIGS. 6A and 6C, a planar shape of the upper surface 321 and the lower surface 322 of the protrusion 32 has an arcuate shape and the protrusion 32 has thicknesses varied according to positions. That is, the thickness of the protrusion 32 increases from the edge of the protrusion contiguous with the coupling portion 31 toward the central portion of the protrusion along the side surface 323.

As such, the side surface 323 of the protrusion 32, that is, the portion facing the corresponding space S212 of the second coupling hole H201 where the coupling portion 31 is located, is formed of a curved surface.

Therefore, since the side surface 323 of the protrusion 32 pressing the damper structure 500 in contact with the adjacent damper structure 500 is not a flat surface but the curved surface, pressure applied to the corresponding portion of the damper structure in contact with the connection unit 30 is increased, thus enhancing combining power.

Therefore, the combining of the tooth adapter 10 and the tooth point 20 is further improved than when the side surface of the protrusion is formed of a flat surface.

The protrusion 32 is serves as a fixing latch for stably positioning the connection unit 30 in the second coupling hole H201 after the connection unit 30 is inserted into the second and third coupling holes H201 and H202.

As such, since the structure of the portion (i.e., coupling portion 31) of the connection unit 30 inserted into the second coupling hole H201 and the structure of the portion (i.e., the insertion portion 33) of the connection unit 30 inserted into the third coupling hole H202 are different, the second and third coupling holes H201 and H202 into which one connection unit 30 is inserted have different structures from each other.

Accordingly, the second coupling hole H201 is a portion where the connection unit 30, which is primarily inserted, is rotated to couple the protrusion 32 to the damper structure 500.

The third coupling hole H202 is a portion where the connection unit 30, which is inserted into the second coupling hole H201, is a secondarily inserted to couple the tooth adapter 10 to the tooth point 20.

As shown in FIG. 7A, a first space S211 and a second space S212 which are portions where the coupling portion 31 of the connection unit 30 is located and a third space S22 which is a portion where the damper structure 500 is located are located in the second coupling hole H201. Here, the guide portion 21 is connected to the first and second spaces S211 and S212 to form a lower end portion partially blocking the first and second spaces S211 and S212, and the support 24 is connected to the third space S22 to form a lower end portion blocking a lower portion of the second space S22.

Accordingly, as shown in FIG. 8, the first space S211 is a space in which a rotational operation of the coupling portion 31 is performed, and the coupling portion 31 rotates in the first space S211.

The second space S212 is a space in which a rotational operation of the protrusion 32 protruding from the coupling portion 31 is performed, and is a space in which the protrusion 32 moves according to the rotation of the coupling portion 31.

Here, with respect to a virtual same central point, a radius of the third space S212 is larger than a radius of the first space S211 and a difference between the two radius may well be determined according to a protruding length of the protrusion 32.

Due to this, a diameter of the second coupling hole H201 is different according to positions.

Meanwhile, the third coupling hole H202 has a circular planar shape having the same diameter, the side surface 313 and the lower surface 312 of the connection unit 30 penetrating through the second coupling hole H202 are located in the third coupling hole H202.

Here, since an outer portion of the third coupling hole H202, that is, part of a portion in contact with the outside, is blocked by the point body 201, a diameter (i.e., an outer diameter) D21 of the third coupling hole H202 exposed to the outside of the point body 201 is smaller than an inner diameter D22 of the third coupling hole H202 and is also smaller than a diameter of the side surface 313.

Therefore, the connection unit 30 inserted into the third coupling portion H202, i.e., the lower surface 332 of the insertion portion 33, does not penetrate through the third coupling hole H202 and is located in contact with the point body 201 covering a portion of the third coupling hole H202, and thus, the third coupling hole H202 is blocked by the lower surface 332. As a result, since the connection unit 30 does not protrude outside the third coupling hole H202, the appearance is fine, a possibility of an accident that may occur due to otherwise protruding connection unit 30 is prevented, and foreign objects such as sand or soil are prevented from being inserted into the third coupling hole H202.

Figure 7B:
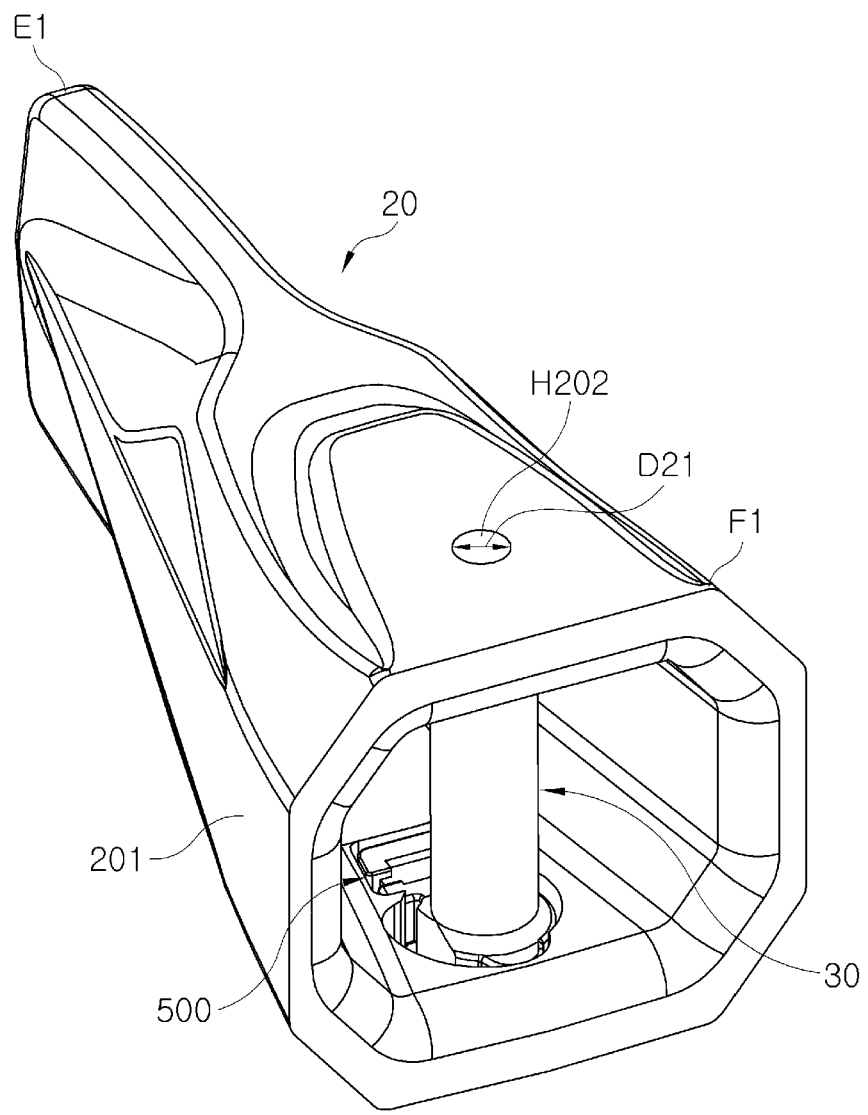
FIG. 7B is a view showing a state in which a connection unit is inserted into a first coupling hole.

According to the structure of the second and third coupling holes H201 and H202, the damper structure 500 is located on the support 24 and the protrusion 32 is inserted into the second coupling hole H201 and the third coupling hole H202 so that the protrusion 32 is located in the guide portion 21 as shown in FIG. 7B.

In order to couple the tooth for a bucket of an excavator having such a structure, first, the damper structure 500 is located on the support 24 located in the second coupling hole H201.

Next, the insertion portion 13 of the tooth adapter 10 is inserted into the insertion recess S20 of the tooth point 20.

By the insertion operation, the positions of the first coupling holes H13 and the second and third coupling holes H201 and H202 of the tooth point 20 located in the insertion unit 13 correspond to each other in a straight line and are aligned in one direction Z.

Figure 8A:
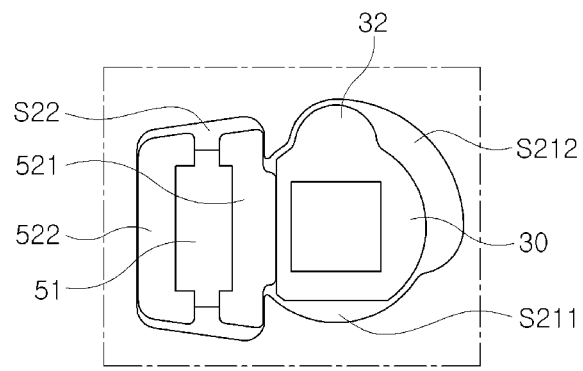
Figure 8B:
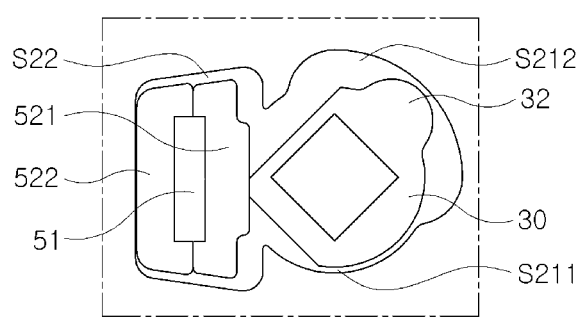
Figure 8C:
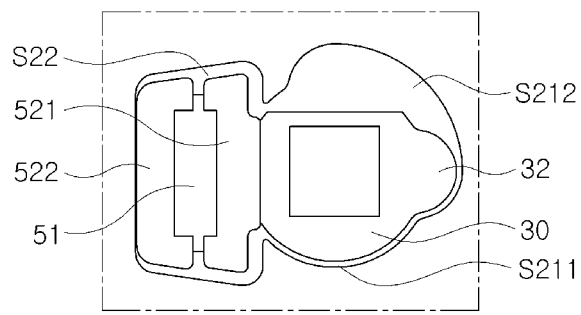

Thereafter, the connection unit 30 is sequentially inserted into the second and third coupling holes H201 and H202 and then rotated in the corresponding direction to insertedly fix the position of the coupling portion 31 of the connection unit 30 in the coupling hole H201 (FIGS. 8A to 8C). That is, when the connection unit 30 inserted into the second coupling hole H201 is rotated in the corresponding direction in the state of (a) of FIG. 8 which is an initial state for a fastening operation, pressure is applied to the first fixing part 521 of the damper structure 500 by an edge portion of the coupling portion 31 of the connection unit 30, that is, by the portion where the adjacent first and second flat surface portions 3131 and 3132 meet.

Therefore, the damper part 51 is compressed by the pressure applied to the first fixing part 521 to move the first fixing part 521 in position toward the second fixing part 522 ((b) of FIG. 8), the connection unit 30 is rotated about 90 degrees by the positional movement of the first fixing part 521, so that the corresponding flat surface portion of the connection unit 30 comes into contact with the first fixing part 521 and the connection unit 30 is fastened ((c) of FIG. 8). Here, pressure is applied to the flat surface portion of the connection unit 30 by a restoring force of the damper part 51 so that the fastening state of the connection unit 30 is stably maintained.

Here, a magnitude of the pressure applied to the corresponding flat surface portion of the connection unit 3 in contact with the first fixing part 521 is further increased by the close contact protrusion P521 of the first fixing part 521, thus further stabilizing the fastening state of the connection unit 30.

In the damper structure 500, both side surface portions of the damper part 51 having elastic force are covered by first and second fixing parts 521 and 522 formed of a metal. As a result, the damper part 51 is prevented from being in direct contact with the point body 201 each time the connection unit 30 is inserted or released, and thus, wear or deformation of the damper part 51 does not occur or is significantly reduced.

In order to release the connection unit 30 insertedly located in the coupling hole H20, the connection unit 30 is rotated in the direction opposite to that of the coupling operation, and here, the connection unit 30 is lowered or lifted along the inclined surface according to the rotational operation and a portion of the connection unit 30 protrudes to the outside. Accordingly, the operator may easily remove the connection unit 30 from the second and third coupling holes H201 and H202 using the outwardly protruding portion (See (a) of FIG. 8).

Hereinafter, a damper structure according to other embodiments of the present disclosure will be described.

In the following embodiment, parts having the same structure and performing the same functions as compared with the damper structure 500 illustrated in FIGS. 1 to 3 are given the same reference numerals and a detailed description thereof will be omitted.

Figure 9:
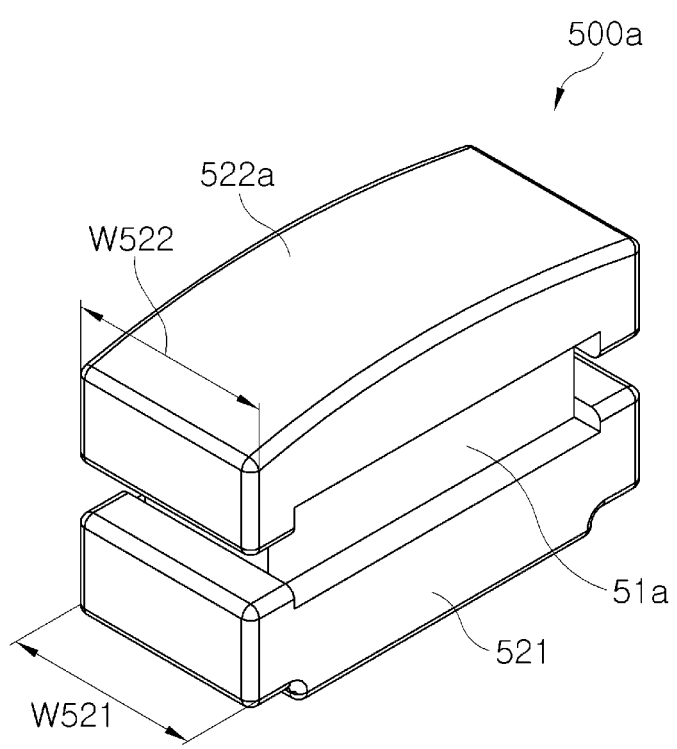
FIG. 9 is a perspective view of a damper structure of a tooth for a bucket of an excavator according to another embodiment of the present disclosure.
Figure 10:
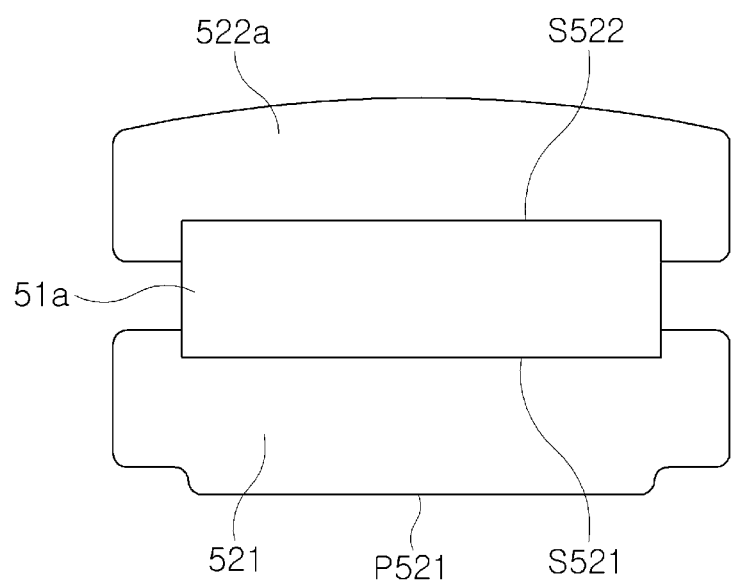
FIG. 10 is a front view of the damper structure of a tooth for a bucket of an excavator shown in FIG. 8.
Figure 11:
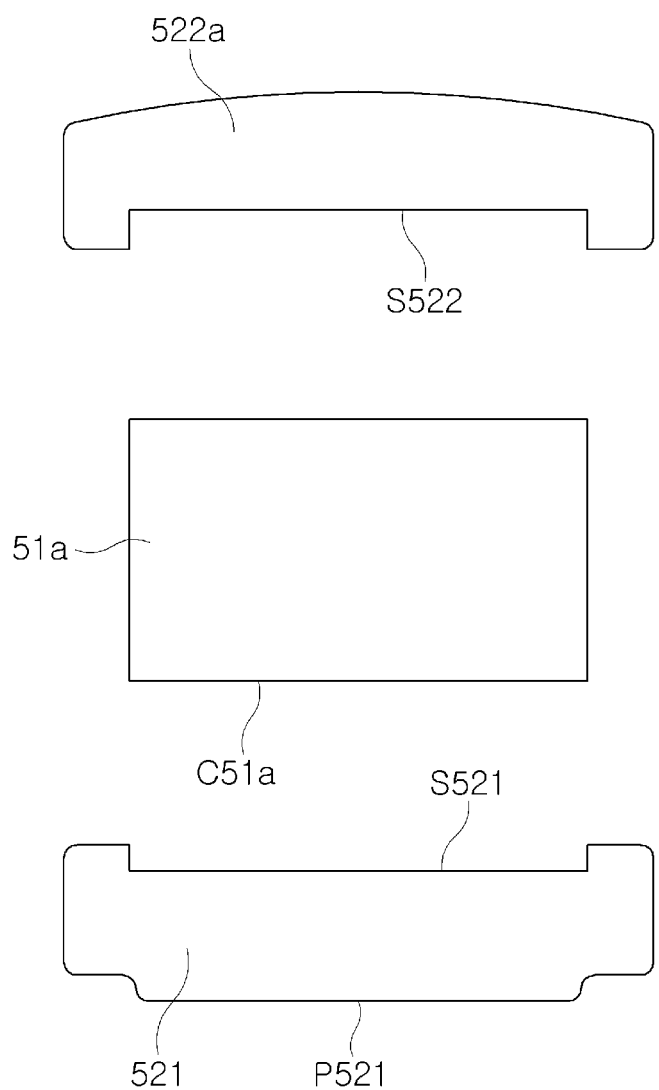
FIG. 11 is an exploded perspective view of the damper structure of a tooth for a bucket of an excavator shown in FIG. 9.

First, a damper structure 500a according to another embodiment of the present disclosure will be described with reference to FIGS. 9 to 11.

The damper structure 500a of the present example includes a damper part 51a and first and second fixing parts 521 and 522a covering both side surface portions of the damper part 51a, similar to the damper structure 500 shown in FIGS. 1 to 3.

In this case, unlike the damper structure 500 of FIGS. 1 to 3, the damper part 51a includes only a damper body having a cube structure and does not include a protrusion.

This reduces a manufacturing cost of the damper part 51a.

According to the damper structure 500a, when pressure is applied to the first fixing part 521, a corresponding surface C51a of the damper part 51a in contact with an inner surface of a longer axis of the first fixing part 521 is compressed to move the first fixing part in position so that a rotational operation of the connection unit 30 is performed.

In addition, an outer surface of the second fixing part 522a is formed of a curved surface rather than a plane surface. Accordingly, when pressure is applied to the second fixing part 522a according to the positional movement of the first fixing part 521, a pressure dispersion effect is obtained, significantly reducing a possibility of breakage and damage of the first and second fixing parts 521 and 522a to obtain an additional effect of enhancing durability of the damper structure 500a.

Figure 12:
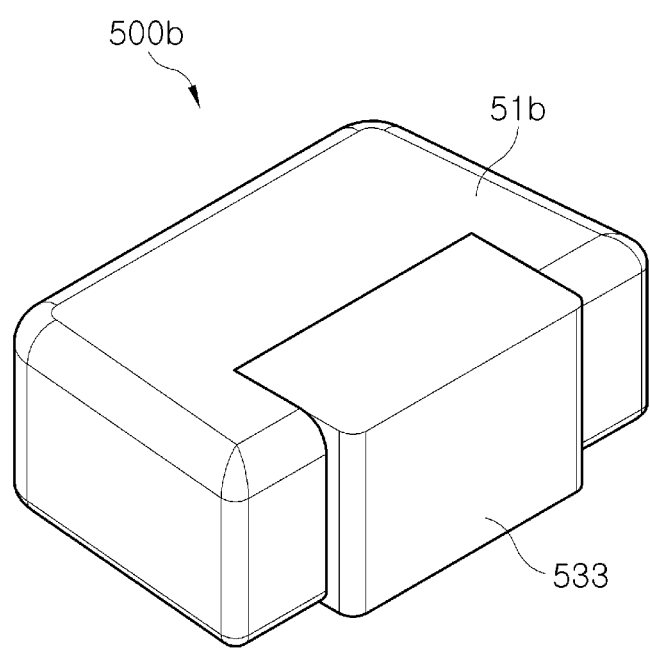
FIG. 12 is a perspective view of a damper structure of a tooth for a bucket of an excavator according to another embodiment of the present disclosure.
Figure 13:
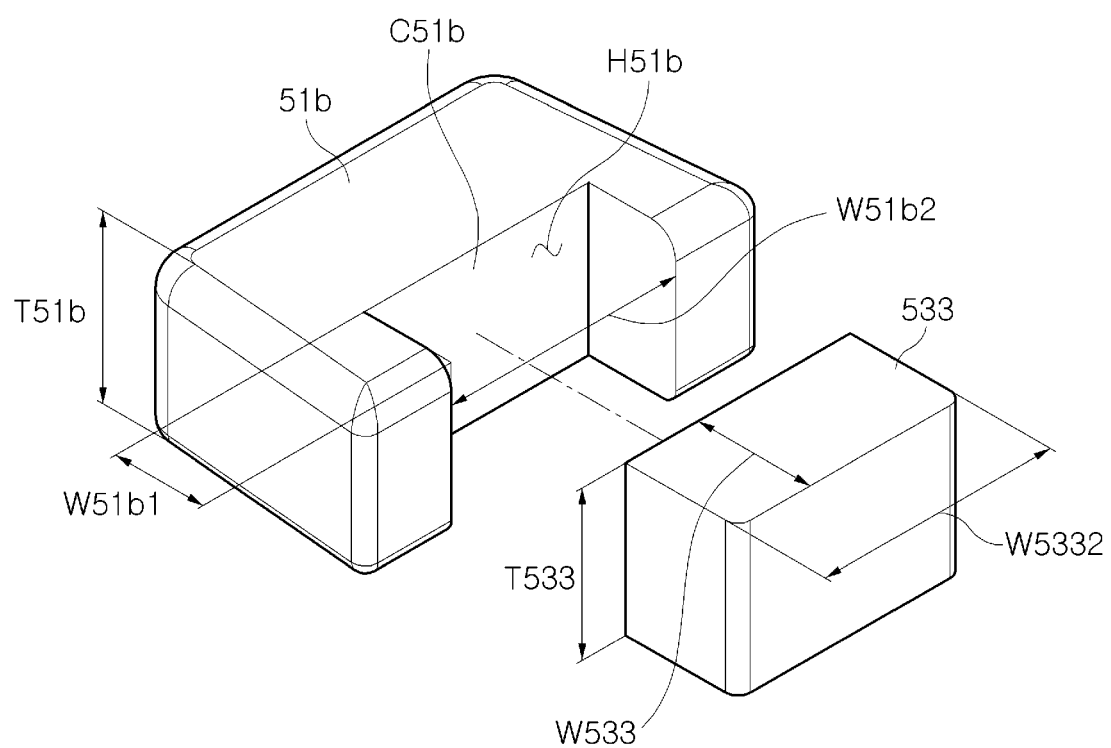
FIG. 13 is an exploded perspective view of the damper structure of a tooth for a bucket shown in FIG. 12.

Next, a damper structure 500b according to another embodiment of the present disclosure will be described with reference to FIGS. 12 to 14.

The damper structure 500b of the present example includes a damper part 51b and a fixing part 533 located at one side portion of the damper part 51b.

In this example, the damper part 51b has a planar shape of a letter 'C' having a quadrangular recess H51b in the middle portion as illustrated.

The fixing part 533 has a quadrangular planar shape and is inserted into the recess H51b of the damper part 51b so as to be coupled to the damper part 51b. Accordingly, three surfaces of the fixing part 533 are surrounded by the damper part 51b and a surface of the fixing part 533 which does not face the recess H51b on the opposite side of the recess H51b protrudes outward from the corresponding surface of the damper part 51b. Therefore, the inner surface of the longer axis of the fixing part 533 inserted into the recess H51b is in contact with the inner surface C51b of the damper part 51b which defines a width W51b2 of the longer axis of the recess H51b.

Here, a thickness T51b of the damper part 51b and a thickness T533 of the fixing part 533 are equal to each other.

However, a width of the shorter axis of the recess H51b of the damper part 51b, that is, a depth W51b1 of the recess H51b may be smaller than a shorter axis width W5331 of the fixing part 533, and a width W51b2 of the recess H51b of the damper part 51b may be smaller than or equal to a longer axis width W5332 of the fixing part 533.

In this case, the fixing part 533 inserted into the recess H51b of the damper part 51b is not released from the recess H51b unless an external pressure is applied, and may protrude outward with respect to the adjacent surfaces of the damper part 51b.

However, the damper structure 500b of the present example may be manufactured through an injection molding operation.

As described above, the damper part 51b may be formed of an elastic material having elasticity and the fixing part 533 may be formed of a metal.

Figure 14:
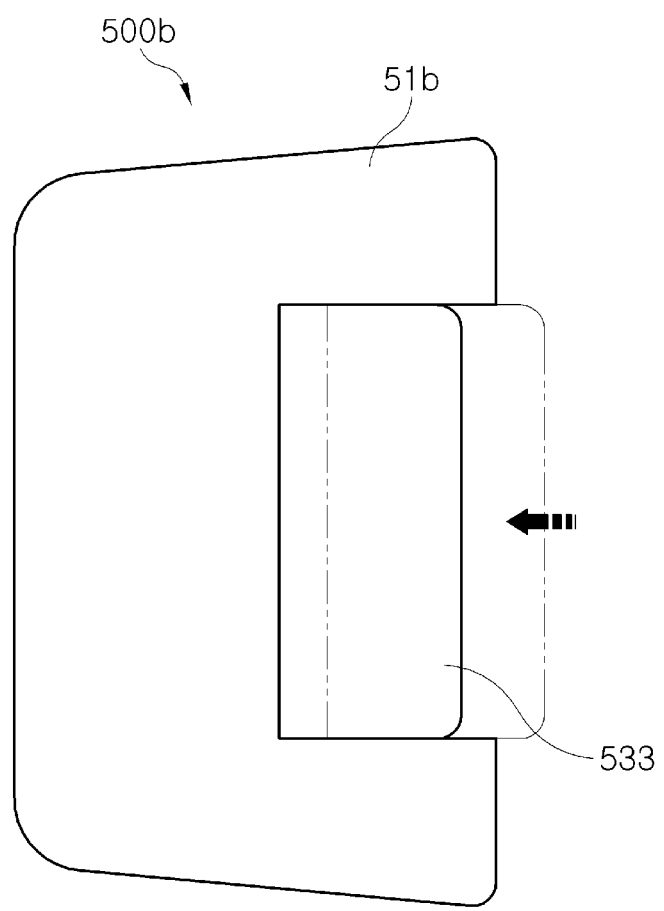
FIG. 14 is a view showing a contracted state of a fixing part when a connection unit is inserted or released in the damper structure of a tooth for a bucket shown in FIG. 12.

Therefore, when the connection unit 30 is rotated in the corresponding direction for fastening or removal thereof, pressure is applied to the fixing part 533 of the damper structure 500b by an edge portion of the coupling portion 31 of the connection unit 30, and by the pressure, the fixing part 533 compresses the corresponding inner surface C51b of the damper part 51b in contact with the longer axis surface of the fixing part 533 to move toward the damper part 51b as shown in FIG. 14, to perform the fastening operation or a removing operation of the connection unit 30.

Here, the fixing part 533 may be positioned on an inner side than an outer surface of the damper part 51b to which the outer surface of the fixing part 533 is adjacent, that is, toward the damper part 51b, and compressed until the adjacent outer surface of the damper part 51b protrudes to an outer side than the outer surface of the fixing part 533.

Since the damper structure 500b uses one fixing part 533, manufacturing cost and manufacturing time are reduced.

Figure 15:
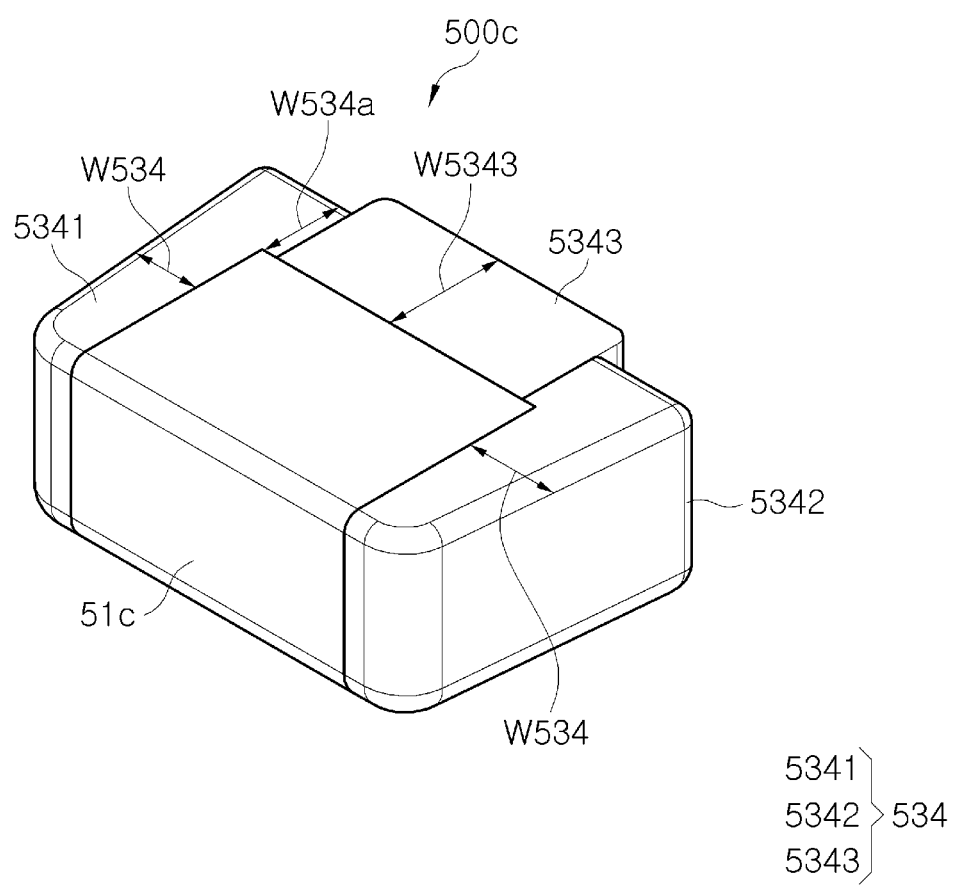
FIG. 15 is a perspective view of a damper structure of a tooth for a bucket of an excavator according to another embodiment of the present disclosure.
Figure 16:
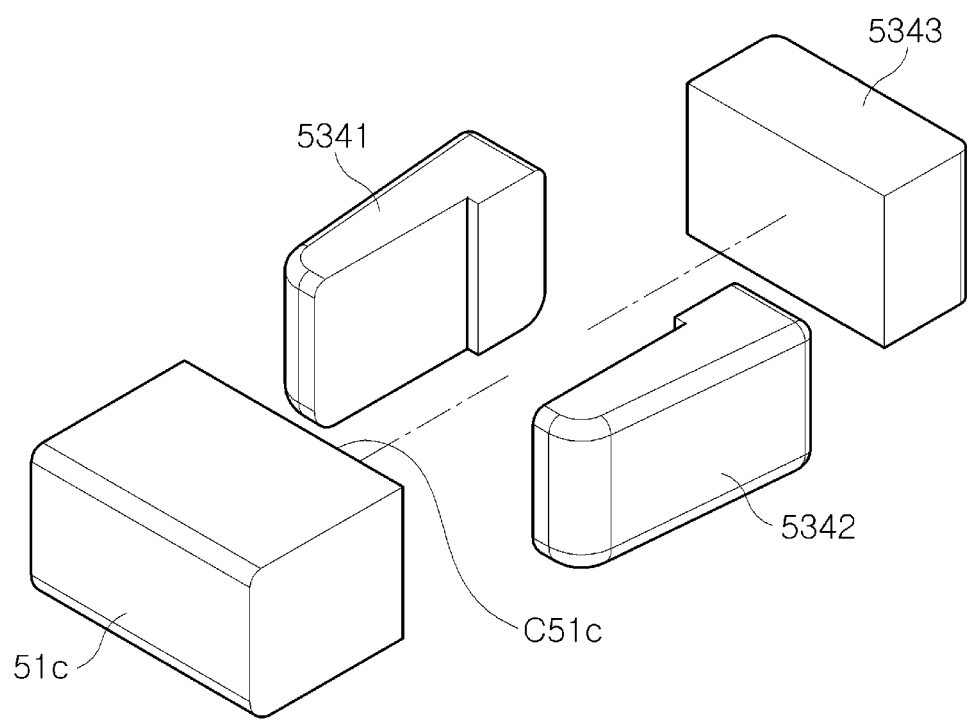
FIG. 16 is an exploded perspective view of a damper structure of a tooth for a bucket shown in FIG. 15.
Figure 17:
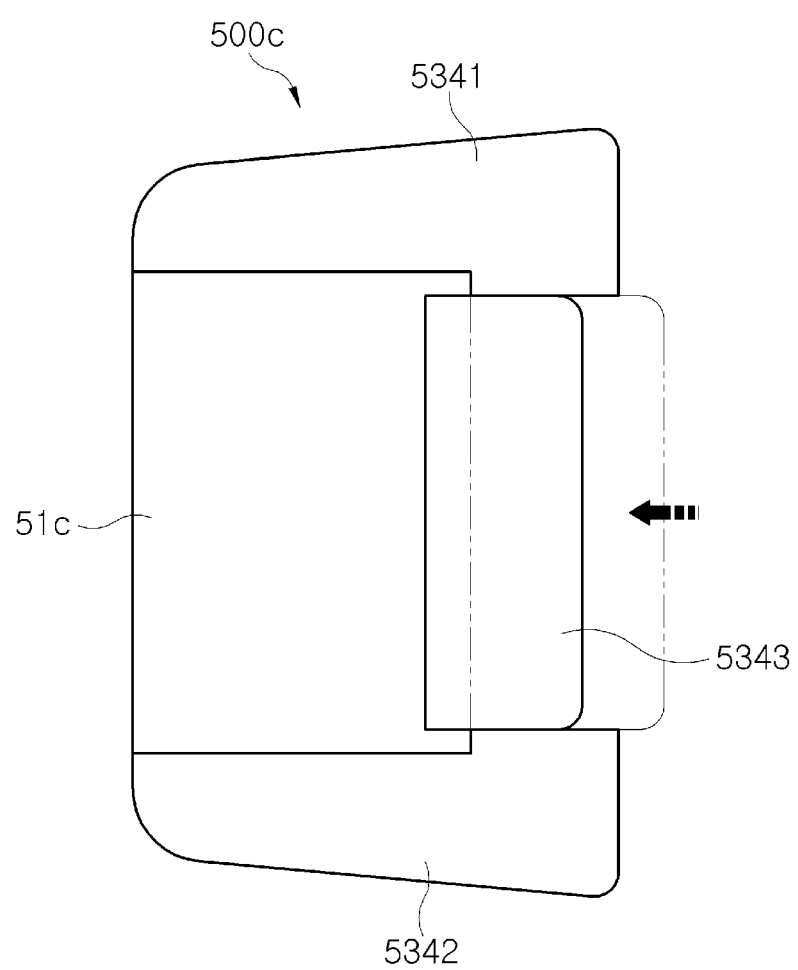
FIG. 17 is a view showing a contracted state of a fixing part when the connection unit is inserted or released in the damper structure of a tooth for a bucket shown in FIG. 15.

A damper structure 500c according to another embodiment of the present disclosure will be described with reference to FIGS. 15 to 17.

The damper structure 500c of the present example has a damper part 51c having a quadrangular planar shape and a fixing part 534 covering the side of the damper part 51c.

The fixing part 534 includes first and second fixing parts 5341 and 5342 (left and right fixing parts) covering the surfaces (e.g., left surface and right surface) facing each other on the mutually opposite sides of the damper part 51c and a third fixing part (e.g., rear fixing part) located between the first and second side surface fixing parts 5341 and 5342 and covering the other surface (e.g., rear surface) of the damper part 51c.

The first and second side surface fixing parts 5341 and 5342 have a shape in which the left and right are reversed.

A width W534 of the first and second side surface fixing parts 5341 and 5342 increases from a portion adjacent to the front surface of the damper part 51c toward a portion adjacent to the rear surface thereof, and a lower end thereof is located on the same imaginary line as the front surface of the damper part 51c.

Further, the first and second side surface fixing parts 5341 and 5342 cover a part of the rear surface of the damper part 51c, having planar shapes of a reversed "L" and "L".

Here, a portion of the rear surface of the damper part 51c between the first and second side surface fixing parts facing each other on the mutually opposite sides with the damper part 51c interposed therebetween is not covered by the first and second side surface fixing parts 5341 and 5342 but exposed.

Thus, the rear surface fixing part 5435 is inserted into the exposed rear portion to cover the exposed rear portion, and an inner surface of the rear surface fixing part 5435 is in contact with an inner surface C51c of the damper part 51c positioned between the first and second side surface fixing parts 5341 and 5342. The rear surface fixing part 5343 is movably in contact with adjacent first and second side surface fixing parts 5341 and 5342. Thus, the rear surface fixing part 5435 is movable in position separately from the first and second side surface fixing parts 5341 and 5342.

Here, a shorter axis width (W5343) of the rear surface fixing part 5343 is larger than a width W534a of a corresponding portion of the first and second side surface fixing parts 5341 and 5342 positioned adjacent to each other, and thus, the rear surface fixing part 5435 protrudes outward with respect to the first and second side surface fixing parts 5341 and 5342.

Therefore, when the connection unit 30 is rotated in the corresponding direction for fastening or removal of the connection unit 30, the edge portion of the coupling portion 31 of the connection unit 30 and the rear surface fixing part 5343 come into contact with each other and pressure is applied to the rear surface fixing part 5343. As described above, since the rear surface fixing part 5343 is movably located separately from the first and second side surface fixing parts 5331 and 5342, the rear surface fixing part 5343 compresses the corresponding inner surface C51c of the damper part 51c in contact with the longer axis surface thereof and moves toward the damper part 51c as shown in FIG. 17, whereby the connection unit 30 is inserted or removed.

Here, the rear surface fixing part 5343 is located on an inner side than the outer surfaces of the first and second side surface fixing parts 5341 and 5342, that is, toward the damper part 51c, and compressed until the outer surfaces of the first and second side surface fixing parts 5341 and 5342 protrude outward with respect to the outer surface thereof.

Since the damper structures 500b and 500c illustrated in FIGS. 12 to 17 include one fixing part 533 and 534, respectively, the manufacturing cost of the damper structures 500b and 500c is further reduced.

As an embodiment of the present disclosure, the case where the first coupling structure part is the tooth adapter 10 and the second coupling structure part is the tooth point 20 has been described but the present disclosure is not limited thereto.

As set forth above, according to embodiments of the present disclosure, since at least one surface of the damper part having elastic force is formed of a metal and covered by at least one fixing part, the damper part is prevented from being in direct contact with the point body each time the connection unit is inserted or removed.

Therefore, wear or deformation of the damper part is prevented, thereby increasing life of the damper structure.

In case where the fixing part is formed as one body, a material of the fixing part is reduced to reduce manufacturing cost of the damper structure.

In case where the fixing part includes the first and second fixing parts, pressure applied to the connection unit is increased by the close contact protrusion located at the first fixing part of the damper structure, thereby improving a binding force of the connection unit.

Thus, a coupling state of the first coupling structure part and the second coupling structure part, which are coupled to each other by the connection unit, is stably maintained.

In addition, since the outer surface of the second fixing part in contact with the connection body is formed as a curved surface, pressure applied toward the second fixing part is dispersed according to a rotational operation of the connection unit, further increasing durability and life of the damper structure.

The embodiments of the damper structure of the present disclosure have been described. The present disclosure is not limited to the embodiments described above and the accompanying drawings and various modifications and variations may be made in view of those skilled in the art to which the present disclosure pertains. Therefore, the scope of the present disclosure should be defined not only by the claims of the present disclosure but also by the equivalents of the claims.

What is claimed is:

1. A damper structure in contact with a connection unit for coupling a first coupling structure part and a second coupling structure part, the damper structure comprising:
    a damper part formed of an elastic material and having a quadrangular recess at a middle portion of one surface; and
    a fixing part having a quadrangular planar shape and inserted into the recess of the damper part so as to be coupled to the damper part, and having an outer surface which is a flat surface, does not face the recess on the opposite side of the recess and protrudes outward from the damper part,
    wherein when the connection unit is inserted and rotated in one direction, due to the pressure applied to the outer surface of the fixing part by the connection unit, the fixing part compresses the damper part until the outer surface is positioned into the recess of the damper part.
2. The damper structure of claim 1, wherein
    a depth of the recess is smaller than a shorter axis width of the fixing part.
3. The damper structure of claim 1, wherein
    the damper part is formed of an elastomer.
4. The damper structure of claim 1, wherein
    the fixing part is formed of a metal.

5. The damper structure of claim 1, wherein the first coupling structure is a tooth adapter and the second coupling structure is a tooth point.

* * * * *